Oct. 14, 1969
G. HOHWART
3,472,526
UNIVERSAL POWER CHUCK
Filed Oct. 17, 1967
2 Sheets-Sheet 1
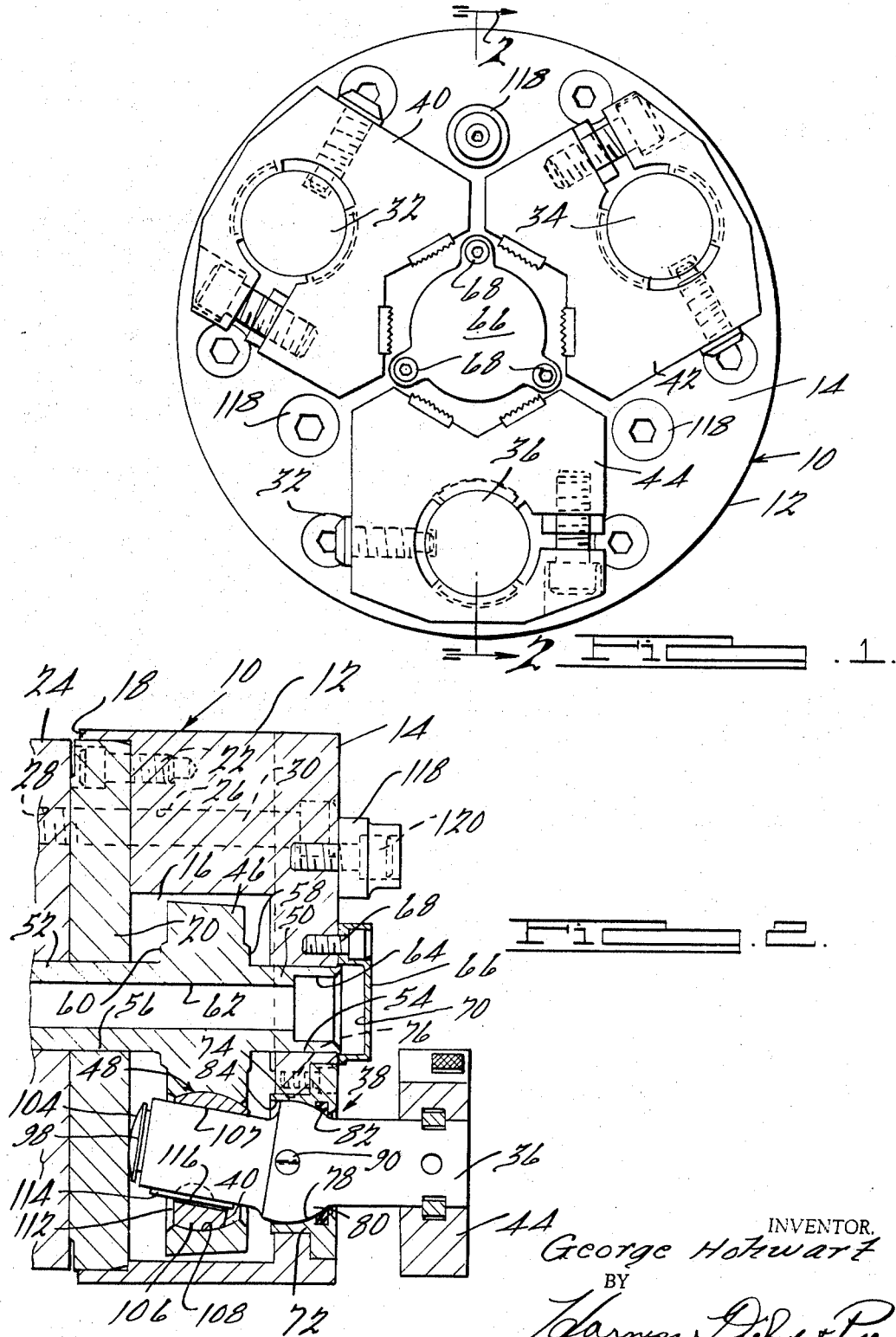
INVENTOR.
George Hohwart
BY
Harness, Dickey & Pierce
ATTORNEYS.

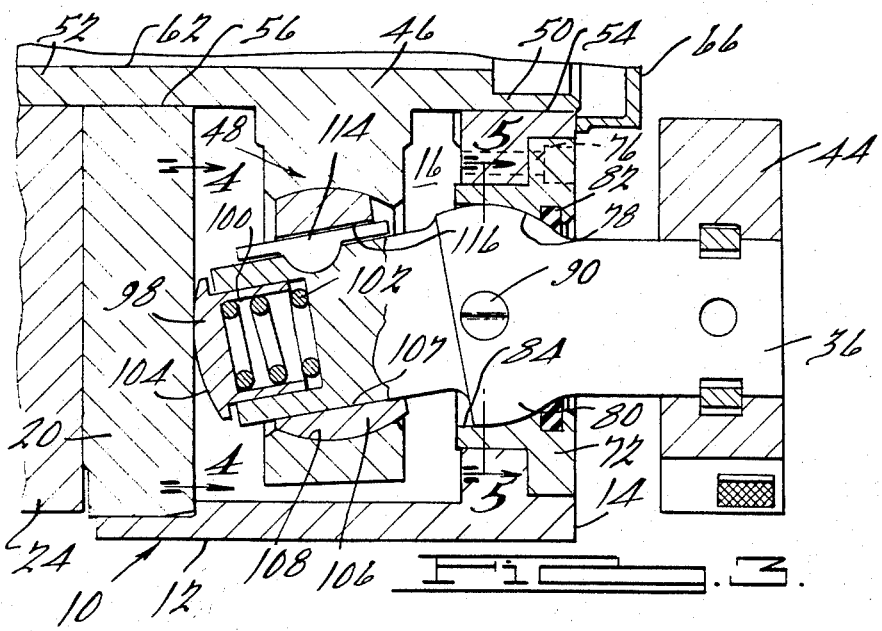

United States Patent Office 3,472,526
Patented Oct. 14, 1969

3,472,526
UNIVERSAL POWER CHUCK
George Hohwart, Farmington, Mich., assignor to N. A. Woodworth Company, Ferndale, Mich., a corporation of Michigan
Filed Oct. 17, 1967, Ser. No. 675,894
Int. Cl. B23b 31/12, 5/22, 5/34
U.S. Cl. 279—106
6 Claims

ABSTRACT OF THE DISCLOSURE

Considered in certain of its broader aspects, the chuck herein disclosed comprises a rotatable body adapted to be mounted on the spindle of a machine tool or the like and having an axially disposed actuator mounted for reciprocation therein and a plurality of generally axially extending rocker arms spaced radially equidistantly around the actuator and mounted for universal rocking movement in fixed swivel mountings provided at the front of the body. Work engaging and clamping jaws are mounted on the forward ends of the rocker arms and the rear portions of the arms are attached to the actuator by slidable swivel mountings on and movable with the actuator.

It is a special feature of the chuck that the front and rear swivel mountings are spaced equidistantly from the axis of the chuck and that the portions of the rocker arms extending rearwardly of the front swivels are inclined angularly with respect to the chuck axis so that reciprocatory movement of the actuator causes the arms to rock on the front swivel mountings and to move the jaws radially into and out of engagement with a workpiece in the chuck. By reason of the fact that all of the swivel mountings are spaced equidistantly from the axis of the chuck, the latter can be adapted easily and quickly for either internal or external operation simply by rotating the rocker arms. For example, if the rocker arms are positioned for external clamping of the workpiece, it can be adapted for chucking a workpiece internally simply rotating the arms 180°. Spring biased detents in the front swivel mountings hold the rocker arms normally positioned for either internal or external chucking. The work holding jaws preferably are removable from the rocker arms so that the jaws can be replaced easily and quickly if necessary when the chuck is converted from one form of chucking operation to another or when required to adapt the chuck for a different kind or size of workpiece.

---

This invention relates to new and useful improvements in work holding chucks.

It is to be understood that the above description is intended merely as a brief description of the invention and as a means of convenient reference but that it not be in any way limiting on the invention described herein or the scope or interpretation of the appended claims.

OBJECTS

From the foregoing, it will be readily apparent that an important object of the present invention is to provide a work holding chuck of the above mentioned character that can be readily adapted for either external or internal chucking simply by rotating the rocker arms.

Another object of the invention is to provide a chuck of the above mentioned character in which the adjustment required to adapt the chuck can be made easily and quickly.

Other objects and advantages of the invention will become apparent during the course of the following description.

DRAWINGS

In the drawings, forming a part of this specification and wherein like numerals are employed to designate like parts throughout the same.

FIG. 1 is a front elevational view of a work holding chuck embodying the invention.

FIG. 2 is a longitudinal sectional view taken on the line 2—2 of FIG. 1 and showing the chuck adapted for external chucking.

FIG. 3 is an enlarged, fragmentary view similar to FIG. 2 but showing the chuck adapted for internal chucking.

FIG. 4 is a fragmentary, transverse plan view looking in the direction of the arrows 4—4 in FIG. 3.

FIG. 5 is a fragmentary, transverse sectional view taken on the line 5—5 of FIG. 3.

FIG. 6 is a fragmentary, longitudinal sectional view similar to FIG. 3 but showing a modified form of the invention.

SUMMARY

The chuck herein disclosed is an improvement on the chuck shown in the Hohwart et al. Patent No. 3,069,181 dated Dec. 18, 1962. The patented chuck has the same basic structure as the one here under consideration; but in the earlier construction the rear swivel mountings are mounted a different distance from the axis of the chuck than the front swivel mountings whereas in the instant construction both the front and rear swivel mountings are disposed the same distance from the axis and the inclined rear portions of the arms are offset radially with respect to the front jaw mounting portions thereof. As a result, it is necessary in the older chuck to replace both the front plate of the chuck body and the actuator and usually also the swivel mountings which connect the rocker arms to the face plate and to the actuator in order to adapt the chuck from external chucking to internal chucking, or vice versa. Manifestly, this conversion is relatively difficult, time consuming, and expensive. On the other hand, the present chuck can be converted from one form of chucking to the other simply by making a rotational adjustment of the rocker arms without replacing or substituting for any part of the chuck with the possible exception of the chuck jaws.

DETAILED DESCRIPTION

In the drawings, wherein for the purpose of illustration are shown preferred embodiments of the invention, the numeral 10 designates a chuck body here shown in the form of a metal casting. The body 10 has a circular peripheral surface 12 and a radial front face 14, and the interior of the body is cored out or recessed, as at 16, to accommodate the working parts of the chuck. As shown, the hollow interior of the body 10 opens through the rear face 18 of the body and is normally closed by an adapter plate 20 which is recessed into the body, as perhaps best shown in FIGURE 2. Screws 22 hold the adapter plate 20 fixedly but detachably fastened to the body 10. As also shown in FIG. 2, the rear plate 20 is adapted for mounting on the front of a machine spindle 24 and for this purpose the body 10 is provided with a plurality of axially extending holes 26 that extend entirely therethrough from front to back and are adapted to match correspondingly internally threaded holes 28 in the spindle 24. Screws 30 extending rearwardly through the holes 26 and into the holes 28 hold the body 10 fastened securely to the spindle 24. The heads of the screws 22 are countersunk into the adapter plate 20 so as not to interfere with the mounting of the plate on the spindle 24 and the screws 30 preferably are countersunk in the front face 14 of the body 10. The adapter plate 20 may of course be shaped or designed as required to fit any particular machine or spindle and the requirements may vary considerably from one machine to another. For example, the adapter plate can be formed with keys or key ways or with driving lugs or recesses and while these features are not shown, they are conventional in the art and are common expedients embodied in drivingly connected work holding chucks to machine spindles.

The chuck here shown by way of illustration is equipped with three rocker arms 32, 34, and 36 which are spaced equidistantly with respect to each other and from the axis of the chuck. As shown in FIG. 2, the rocker arms 32, 34, and 36 extend axially through the front face 14 of the body 10 and each is attached to the body by a fixed swivel mounting 38. The outer ends of the rocker arms 32, 34 and 36, which extend forwardly of the body 10, carry work clamping jaws 40, 42, and 44, respectively; and the inner ends thereof which are accommodated entirely within the hollow interior of the body, are each attached to a reciprocable actuator 46 by a sliding swivel mounting 48.

As suggested heretofore and as shown in the drawings, the front and rear swivel mountings 38 and 48 are disposed equidistantly from the axis of the chuck. Also, it will be observed that the portions of the rockers arms 32, 34 and 36 which extend rearwardly from the front mountings 38 are inclined with respect to the axis and in order to adapt the inclined arm portions to the swivel arrangement, the arm portions are offset radially from the forward jaw carrying portions of the arms 38. When the chuck is adapted for external chucking, as shown in FIG. 2, the rear portions of the rocker arms 32, 34 and 36 incline or converge inwardly and are offset outwardly at the front swivel mountings 38 and with respect to the front portions of the arms. On the other hand, when the chuck is adapted for internal chucking, as shown in FIG. 3, the rear portions of the rocker arms 32, 34, and 36 diverge from each other toward the rear or back of the chuck and with respect to the axis of the chuck, and they are offset inwardly with respect to the front jaw carrying portions. It will be readily apparent in this connection that the rocker arms 32, 34 and 36 are identical in both chucking arrangements and that the rocker arms in FIG. 3 are simply turned 180° from the position in which they are shown in FIG. 2. It is this combination of features; viz, the equal spacing of the front and rear swivel mountings 38 and 48 from the axis of the chuck and the offsetting of the inclined rear portions of the rocker arms 32, 34 and 36 that permits the ready adaptability of the chuck for either internal or external chucking.

The actuator 46 preferably is in the form of a spider having three equally circumferentially spaced radial arm or lobe portions which carry the rear swivel mountings 48 and connect with respective rocker arms 32, 34 and 36, and the hollow interior 16 of the chuck body 10 preferably is correspondingly shaped but larger in size than the adapter so that the mounting and attaching screws 22 and 30 and the various accessories and attachments of the chuck extend through or are mounted on solid portions of the body. Aligned, centrally disposed, axially extending front and rear journal portions 50 and 52 on the actuator 46 are snugly but slidably received in openings 54 and 56 provided centrally in the front face of the body 10 and in the rear adapter plate 20, respectively. Thus, the actuator 46 is guided for reciprocatory travel in the body 10 and travel in both directions is limited by front and rear abutments 58 and 60. It will be apparent in this connection that the front abutment 58 seats against the bottom of the recess 16 when the actuator 46 is at the forward limit of its travel and that the abutment 60 engages the adapter plate 20 when the actuator is at the rearward limit of its travel. A hole 62 extending axially through the actuator and having a countersink 64 at the forward end thereof is provided to accept a machine screw (not shown) by means of which the actuator is connected to a drawbar (not shown) disposed within the spindle 24. A cap 66 mounted centrally on the front of the body 10 and attached thereto by screws 68, covers the front opening 54 and protects the journal 50 which projects forwardly of the body when the actuator 46 is at the forward limit of its travel. In this connection, it will be observed that the cap 66 is formed with an internal pocket, or recess, which coincides with the opening 54 and progressively receives the journal 50 as the actuator moves forwardly from the position shown in FIG. 2. Drawbars of the type referred to are conventional equipment in machine tools and it is common practice to attach the operating parts of chucks mounted on the spindle 24 to the drawbar in the manner hereinabove described. In this connection, it will be observed also that the rear journal 52 extends entirely through the adapter plate 20 and into the spindle 24 for convenient attachment to the drawbar. Also, it will be readily apparent that, while the actuator 46 here shown is intended for attachment to a mechanical drive means such as the drawbar of a machine tool, it can easily be adapted for hydraulic operation and for attachment to machines equipped with hydraulic drive means.

All of the front swivel mountings 38 are identical in construction and each preferably has the form illustrated in FIG. 2, which shows the particular mounting associated with the rocker arm 36. A detailed description of this mounting is now given and it will be understood that the mountings associated with the rocker arms 32 and 34 are identical thereto.

The swivel mounting 38 here shown by way of illustration is a type known as a "roll back" bearing, and mountings of this general type are covered by the copending application of George Hohwart and Paul Toth, Ser. No. 552,869, filed May 25, 1966. Specifically, this mounting comprises an annular ring member 72 which fits snugly in an opening 74 provided in the front face 14 of the body 10 and is fastened securely to the latter by screws 76. The inner annular surface 78 of the ring 72 is spherically curved and conforms to the ball portion 80 of the rocker arm 36 disposed therein. As shown, the ball portion 80 seats forwardly against the spherical seat 78 and an annular seal 82 provided in the seat adjacent the front face of the ring member 72 prevents dirt and other foreign matter from entering the chuck body or from working into the space between the ball and the seat. Behind the seat 78 and extending therefrom is a generally cylindrical surface 84 onto which the ball portion 80 rolls when the rocker arm moves into clamping engagement with a workpiece (not shown). As the ball portion 80 rolls back onto the cylindrical rear surface 84 it pulls the workpiece in the direction of the chuck body 10 and against fixed stops conveniently provided on the body.

A hole 86 extending diametrically through the ball 80 receives detents 88 and 90 (FIG. 5) which are normally held apart by a spring 92 disposed therebetween so that the wedge shaped outer ends of the detents are lodged in and retained by suitable notches or recesses 94 and 96 provided at diametrically opposite sides of the seat 78. The detents 88 and 90 hold the rocker arm 36 normally positioned as shown in FIG. 2, but they in no way interfere with or prevent radial rocking motion of the arm. However, the detents 88 and 90 will ride out of the positioning recesses 94 and 96 if sufficient turning force or torque is applied to the arm, as by means of a wrench or the like, so that the arm can be rotated to the position shown in FIG. 3, for example, and converted for internal chucking. Thereafter, the detents 88 and 90 re-enter the recesses 94 and 96 and hold the arm 36 in the converted position. In both the internal and external positions of the jaws the detents 88 and 90 may ride up the tapered sides and part way out of the recesses 94 and 96 as required to permit the jaws to adjust rotatably to the workpiece being chucked and after the workpiece is released the detents return the jaws to their normal neutral or "centered" position.

In order to hold the ball portion 80 normally engaged with the seat 78 the rocker arm 36 (and each of the others also) is provided at the inner or rearward end thereof with a plunger 98 slidably mounted in a recess 100 in the arm, and a compression spring 102 confined in the recess behind the plunger urges the latter constantly against the rear adapter plate 20. The plunger 98 moves in and out of the recess 100 as the rocker arm moves radially during operation of the chuck, and the spring 102 urges the plunger constantly against the front adapter plate with sufficient force to hold the front swivel mounting 38 tight at all times. A spherical end surface 104 on the plunger 98 minimizes friction between the plunger and the adapter plate.

Similarly, the rear swivel mountings for all the rocker arms 32, 34 and 36 are identical in construction and operation, and a detailed description of the one shown in FIG. 2 for the arm 36 therefor will suffice. The rear mounting 48 here shown is of the type shown in the Hohwart et al. Patent No. 3,069,181 dated December 18, 1962. It comprises a ball member 106 having an opening 107 therein which slidably receives the portion of the rocker arm 36 extending rearwardly from the front swivel mounting 38. The spherically curved outer surface of the ball member 106 is received in a correspondingly spherically curved seat 108 formed in the actuator 46, so that the ball member is constrained to move reciprocally with the actuator but is free to swivel or turn universally freely in the opening 108. In practice, the ball member 106 is slipped sideways into the seat 108 through slots 109 and 111 provided in the actuator 46 at opposite sides of the seat and then rotated to the position shown in FIG. 2. Thereafter, the rocker arm 36 is inserted through the opening 107, and assembly is completed by fastening the front swivel retainer ring 72 securely to the body 10.

As suggested, the rear portions of the rocker arms 32, 34 and 36 converge rearwardly when the arms are positioned for external chucking, as shown in FIG. 2. Consequently, when the actuator 46 is retracted it carries the ball members 106 with it and causes them to slide rearwardly on the rocker arms 32, 34 and 36 so that the arms pivot or rock on the front swivels 38 and move the outer ends thereof radially inwardly to clamp a workpiece (not shown) in the chuck. Conversely, when the actuator 46 is advanced, the ball members 106 move forwardly on the rocker arms and pivot the latter in the opposite direction to move the outer ends of the arms radially apart.

The front and rear surfaces of the ball members 106 preferably are flat as shown at 110 and 112 so as to minimize the clearances required within the chuck body 10; and, for the same reason, the front and rear surfaces are arranged in tapered relation with respect to each other. In every instance, the widest side of the ball member 106 is positioned to sustain the radial thrust or force imposed by the actuator 46 when the rocker arms are moved to the work clamping position. Keys 114 carried by the arms 32, 34 and 36 operate on radial slots 116 in the ball members 106 to prevent the latter from turning on the rocker arms and thereby to hold the wide sides of the ball members in the direction of thrust.

Any suitable form of work clamping jaw can be provided on the outer ends of the rocker arms 32, 34, 36. Jaws of the type disclosed in the Hohwart et al. Patent No. 3,104,886 dated Feb. 24, 1963, are here shown by way of illustration.

Three work stops 118 are here shown mounted on the front face 14 of the chuck body 10 intermediate the rocker arms 32, 34, 36 and the stops are fastened to the body in any suitable manner as by screws 108. It will be observed that the outer ends of the stops 118 extend flush with each other and that they are spaced equidistantly from the front face 14 of the chuck body 10 so that a workpiece in the chuck with its rear surface seated on the stops 118 is positioned squarely in the chuck for engagement by the jaws 40, 42, 44 and precisely coaxially to the rotational axis of the chuck. Also, as shown in FIG. 2, the stops 118 project forwardly of the cap 66 so that the latter does not interfere with the workpiece during chucking.

The form of the invention shown in FIG. 6 is identical to the form first described except that the front and rear swivel mountings 38 and 48 are of a modified construction similar to the ones disclosed in the Hohwart et al. Patent No. 3,069,181 (supra) and the front swivel mounting 38 is sealed by a separate sealing element 122 as also disclosed in the patent. The modified swivel mountings shown in FIG. 6 eliminate the need for the spring loaded plungers 98 but on the other hand they require more room and therefore greater clearances in the chuck body 10. The chuck shown in FIG. 6 therefore is not as compact as the one shown in FIG. 2. Also, in the modified form of the invention the rear adapter plate is shown in one piece with the body and the front or face of the latter is removable as in the patented construction. Manifestly, however, these differences in structure do not effect the operation of the chuck or the features comprising the invention herein disclosed.

As previously pointed out the chuck shown in FIG. 2 is adapted for external clamping and the chuck shown in FIG. 6 is adapted for internal clamping but the basic operation of both chucks is the same. In both instances the rocker arms 32, 34 and 36 are positioned to hold the jaws 40, 42, 44 disengaged from the workpiece when the actuator 46 occupies a forward position in the chuck body 10. However, when the actuator 46 is retracted, it rocks the arms 32, 34 and 36 simultaneously to move the jaws 44 into clamping engagement with the work. Further, inasmuch as the outer or forward terminal portions of the rocker arms 32, 34 and 36 which extend forwardly of the chuck body 10 and which carry the jaws 44 normally are disposed radially inwardly of the centers of the front swivel mountings 38 in the work clamping position, they also function to pull the workpiece rearwardly against the stops 118 as the actuator applies full clamping pressure to the arms. In addition, the roll-back bearings 38 disclosed in FIG. 2 augment this "pull-back" action of the chuck when the ball portions 80 roll back on the cylindrical rear surfaces 84 as described in greater detail in the copending application referred to above.

Heretofore, in chucks of the type herein disclosed the front swivel mountings 38 have been located a different distance radially of the chuck axis than the rear swivel mountings 48 in order to accommodate the latter to the inclined rear portions of the rocker arms 32, 34, 36. This arrangement was satisfactory from an operational point of view but it has the disadvantage that important and expensive parts of the chuck such as the body 10 in the construction shown in FIG. 2 or the face plate portion of the body in the construtcion shown in FIG. 6, the actuator 46 and usually the swivel mountings 38 and 48 have to be replaced in order to convert the chuck from an internal chuck to an external chuck, or vice versa. The chuck disclosed in this application differs primarily from the prior art construction referred to in that both the front and rear swivel mountings 38 and 48 are disposed equidistantly radially from the axis of the chuck and the inclined rear portions of the rocker arms 32, 34 and 36 are adapted to this spatial relationship of the swivel mountings by being offset radially from the front portions of the arms. This relationship is clearly shown in FIG. 6 wherein the center line 124 of the inclined rear portion of the rocker arm 36 is shown offset at the forward end thereof radially inwardly from the center of the front swivel mounting 38 and from the center line 126 of the front arm portion. In this instance, the rear portion of the arm 36 is offset inwardly from the front portion thereof because the arm 36 is positioned to clamp a workpiece internally. If, however, the arm 36 were turned 180° to position the jaw 44 for external clamping, the rear portion of the arm manifestly would be offset radially outwardly from the front portion thereof. Turning of the arm 36 in the manner described is possible only because the two swivel mountings 38 and 48 are disposed in line with each other and equidistantly from the rotational axis of the chuck. Further, it will be readily appreciated that the only thing necessary to convert the chuck is the turning of the rocker arms 32, 34 and 36. No replacement or substitution of any part of the chuck is required, although it sometimes is necessary or desirable to replace or adapt the jaws 44 for the different chucking condition.

While the offset arrangement of the rocker arm portions shown in FIG. 6 is generally satisfactory, it has the disadvantages that relatively great clearances are required within the chuck body and that a weak point exists at the juncture at the two arm portions which might be a problem if the chuck were required to apply exceedingly high clamping pressures. These disadvantages are overcome to a large extent in the construction shown in FIG. 2. In the latter construction, the rear portion of each rocker arm is offset from the front portion in the manner hereinabove described but the amount of offset is less and, to compensate for the reduction in offset, the opening 107 is eccentrically positioned in the ball member 106. This arrangement is more compact than the one shown in FIG. 6. However, it in no way effects the operation of the chuck or its ability to be converted easily and quickly for either internal or external chucking. Further, the eccentric position of the opening 107 in no way effects the ability of the actuator 46 to operate the rocker arm, and the fact that the centers of the ball members 80 and 106 are still spaced equidistantly from the rotational axis of the chuck makes it possible to convert the latter for either internal or external chucking by simply turning the rocker arms 180° as described.

Having thus described the invention, I claim:

1. A power chuck comprising
    a rotatable body,
    an actuator mounded for reciprocation in said body,
    a plurality of generally axially extending rocker arms having forward jaw mounting portions and rearward actuating portions,
    fixed front swivel mountings in said body and supporting said rocker arms intermediate said forward and rearward portions,
    rear swivel mountings connecting said rocker arms to said actuator fixed to and reciprocable with the actuator and slidable on the rearward portions of said rocker arms,
    the centers of all said swivel mountings being spaced equidistantly from the axis of said body, the rearward portions of said rocker arms extending rearwardly of said front swivel mountings and through said rear swivel mountings being inclined with respect to the axis of the chuck, and the axes of the rearward portions of said rocker arms being offset radially with respect to the centers of said front swivel mountings.

2. The combination as set forth in claim 1 wherein said rear swivel mountings comprising
    ball members on and slidable along the rearward portions of said rocker arms and mounted for universal turning movement in correspondingly spherically curved seats on said actuator.

3. The combination as set forth in claim 2 wherein the rearward portions of said rocker arms extend eccentrically through said ball members.

4. The combination as set forth in claim 2 wherein the front and rear portions of said ball members are flattened to minimize clearances required at the swivel mountings when the actuator is at the extreme limits of its travel.

5. The combination as set forth in claim 3 wherein said ball members are formed with flat front and rear faces which taper in a radial direction with respect to the axis of the chuck to define a maximum bearing area at one side of each ball member and a minimum bearing area at the opposite side of each bearing member, and
    wherein the rearward portions of said rocker arms are disposed closer to the maximum bearing areas of said ball members than to the minimum bearing areas of said ball members.

6. The combination as set forth in claim 2 wherein
    said rocker arms are positionable and adaptable for either internal or external checking operations by being turned substantially 180° in said swivel mountings, and
    wherein one of said swivel mountings is provided with spring biased detent means for holding rocker arms selectively in one of said positions.

References Cited

UNITED STATES PATENTS 3,069,181  12/1962  Hohwart et al. _____ 279—106
3,365,206  1/1968   Hohwart et al. _____ 279—106

ROBERT C. RIORDON, Primary Examiner